United States Patent
Sakata (10) Patent No.: US 9,473,657 B2
(45) Date of Patent: Oct. 18, 2016

(54) IMAGE FORMING APPARATUS AND IMAGE FORMING METHOD CAPABLE OF PREVENTING PRINTED MATTER FROM BEING TAKEN AWAY BY OTHER USERS

(71) Applicant: KYOCERA Document Solutions Inc., Osaka (JP)

(72) Inventor: Hiromi Sakata, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/839,520

(22) Filed: Aug. 28, 2015

(65) Prior Publication Data

US 2016/0065774 A1    Mar. 3, 2016

(30) Foreign Application Priority Data

Aug. 28, 2014   (JP) ................. 2014-174186

(51) Int. Cl.
*H04N 1/00*       (2006.01)

(52) U.S. Cl.
CPC ........ *H04N 1/00875* (2013.01); *H04N 1/0032* (2013.01); *H04N 1/00037* (2013.01); *H04N 1/00055* (2013.01); *H04N 1/00204* (2013.01); *H04N 1/00838* (2013.01); *H04N 2201/0094* (2013.01)

(58) Field of Classification Search
None
See application file for complete search history.

(56) References Cited

U.S. PATENT DOCUMENTS

2009/0052913 A1* 2/2009 Kawamura .......... B41J 13/0036
                                                                 399/45
2013/0107308 A1* 5/2013 Maeda .................. G06F 3/1204
                                                                 358/1.14
2014/0092417 A1* 4/2014 Kuroishi ............ H04N 1/00342
                                                                 358/1.14

FOREIGN PATENT DOCUMENTS

JP      2002-226132 A    8/2002
JP      2002-316765 A   10/2002

* cited by examiner

*Primary Examiner* — Andrew H Lam
(74) *Attorney, Agent, or Firm* — Hawaii Patent Services; Nathaniel K. Fedde; Kenton N. Fedde (57) ABSTRACT

Provided is an image forming apparatus capable of preventing a printed matter from being inadvertently taken away by other users. The image forming apparatus mainly includes a first determination part, a second determination part, and a job control part. The first determination part determines whether there exists a second printing job to be executed subsequent to the first printing job. The second determination part determines whether the time measured by the timer part has passed a predetermined period if it is determined that there exists the second printing job. The job control part performs interval control for causing the printing part to execute the second printing job after the predetermined period has passed if it is determined that the predetermined period has not yet passed.

18 Claims, 7 Drawing Sheets

PRINTING JOB A (SINGLE-SIDED) | PREDETERMINED PERIOD (6 seconds) | PRINTING JOB B (DOUBLE-SIDED) | PREDETERMINED PERIOD (12 seconds) | PRINTING JOB C (SINGLE-SIDED)

IMAGE FORMING APPARATUS AND IMAGE FORMING METHOD CAPABLE OF PREVENTING PRINTED MATTER FROM BEING TAKEN AWAY BY OTHER USERS

INCORPORATION BY REFERENCE

This application is based on and claims the benefit of priority from Japanese Patent Application No. 2014-174186 filed on Aug. 28, 2014, the entire contents of which are hereby incorporated by reference.

BACKGROUND

The present disclosure relates to control of receiving data indicating an image transmitted via a network and discharging a printed matter on which the image is printed.

Specific examples of an image forming apparatus include a network printer. The network printer is a printer shared by multiple users. There is a network printer provided with plural bins for sorting a printed matter of each user. The printed matter created by the execution of a printing job is discharged into the bins and is held therein.

For the network printer in which the plural bins into which the printed matter is to be discharged are previously allocated to every user, there has been proposed a technology of allocating an available bin out of the plural bins to a user to whom no bin has not been allocated.

Additionally, there also has been proposed another technology in which overflow detection means is provided in each of the plural bins of a network printer, and which stores image data to be printed by a printing job without executing a printing job discharging a printed matter into a pin whose amount of the printed matter exceeds a permissible amount.

SUMMARY

An image forming apparatus comprising a receiving part that receives data indicating an image transmitted via a network; a printing part that executes a printing job creating a printed matter on which the image is printed indicated by the data received by the receiving part; a paper discharging part into which the printed matter created by the printing part is discharged and in which the printed matter is held; a timer part; a timer control part that causes the timer part to start measuring a time when a first printing job that is a printing job precedingly executed is completed; a first determination part that determines whether or not there exists a second printing job that is a printing job to be printed subsequent to the first printing job; a second determination part that determines whether or not a time measured by the timer part has passed a predetermined period when it is determined by the first determination part that there exists the second printing job; and a job control part that performs interval control causing the printing part to execute the second printing job after the predetermined period has passed when it is determined by the second determination part that the predetermined period has not yet passed.

An image forming method comprising the steps of receiving data indicating an image transmitted via a network; executing a printing job creating a printed matter on which the image received by a receiving part is printed; holding the created and discharged printed matter; causing a timer part to start measuring a time when a first printing job that is a printing job precedingly executed; determining whether or not there exists a second printing job to be executed subsequent to the first printing job; determining whether or not the time measured by a timer part has passed a predetermined period when it is determined that there exists the second printing job; and performing interval control after the predetermined period has passed when it is determined that the predetermined period has not yet passed.

DETAILED DESCRIPTION

Figure 1:
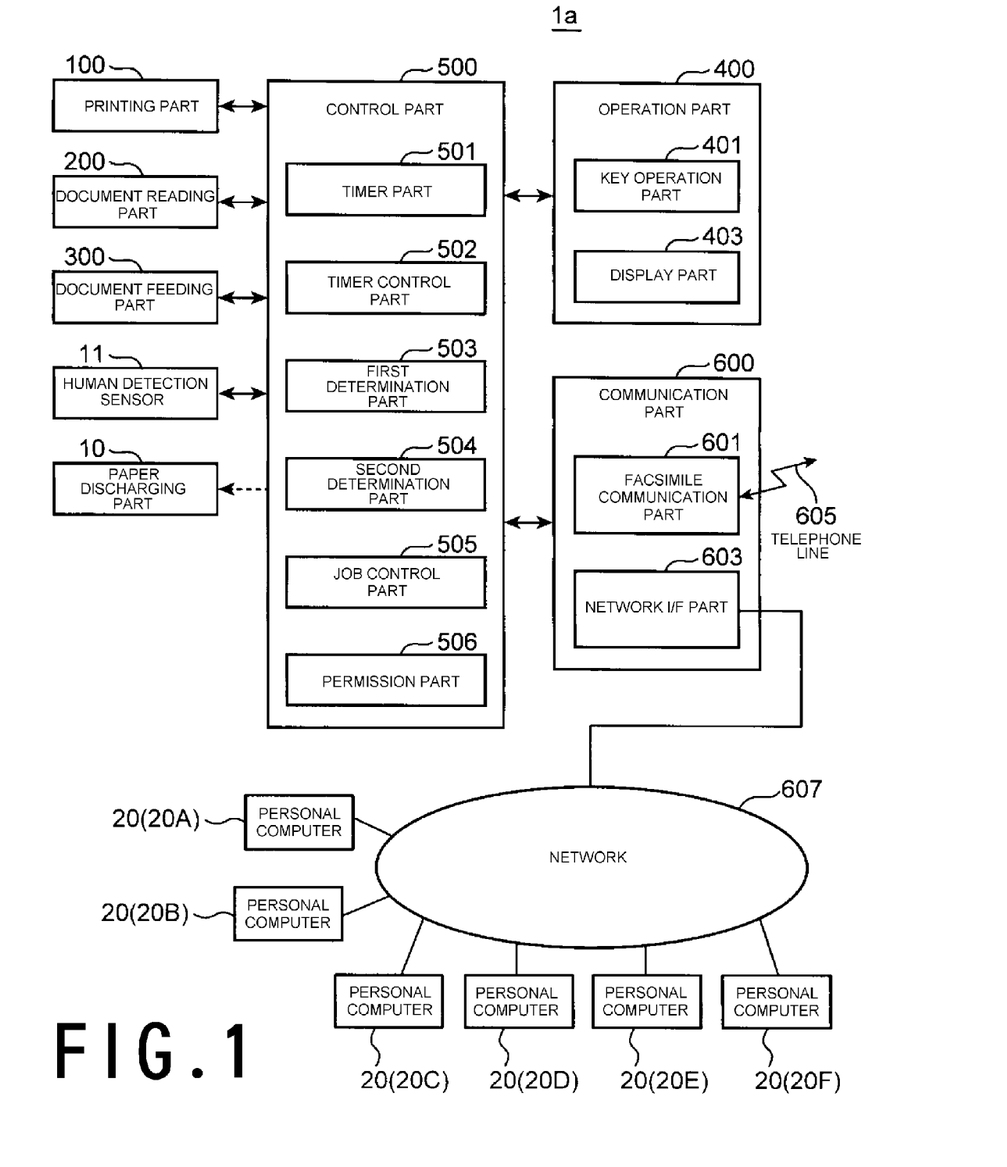
FIG. 1 is a block diagram indicating a configuration of an image forming apparatus according to a first embodiment of the present disclosure.

Hereinafter, exemplary embodiments of the present disclosure will be described in detail with reference to the accompanying drawings. FIG. 1 is a block diagram indicating a configuration of an image forming apparatus 1a according to a first embodiment of the present disclosure. As an example of the image forming apparatus 1a, a description will be made by taking a digital multifunction machine 20 as an example, which has a copy function, a printer function, a scanner function, and a facsimile function. It is to be noted that the image forming apparatus 1a should only have a function of printing an image, and hence is not necessarily limited to the digital multifunction machine. For example, a printer may be taken as the image forming apparatus 1a. The image forming apparatus 1a includes a printing part 100, a document reading part 200, a document feeding part 300, an operation part 400, a control part 500, a communication part 600, a paper discharging part 10, and a human detection sensor 11.

When a piece of document is placed on a document mounting part of the document feeding part 300, the document feeding part 300 feeds the document to the document reading part 200. When a plurality of documents are stacked on the document mounting part of the document feeding part 300, the document feeding part 300 sequentially feeds the plural documents to the document reading part 200.

The document reading part 200 reads the document placed on a platen or the document fed from the document feeding part 300. Then, the document reading part 200 outputs image data of the document.

The printing part 100 executes a printing job. Here, the printing job is a job creating a printed matter on which an image indicated by the data is printed. Examples of the data indicating an image include, for example, image data output from the document reading part 200, print data transmitted from a personal computer, and image data received by a facsimile.

The printed matter created by the printing part 100 is discharged into the paper discharging part 10 and is held therein. The paper discharging part 10 is sometimes referred to as a paper discharging tray, for example.

The human detection sensor 11 outputs a detection signal if a human is in the vicinity of the image forming apparatus 1a. The human detection sensor 11 detects the presence of the human in the vicinity of the image forming apparatus 1a using infrared or ultrasonic waves.

The operation part 400 includes an operation key part 401 and a display part 403. The display part 403 is provided with a touch panel function, and displays a screen including a virtual keyboard. A user sets settings required for the execution of a copy function or the like by operating the soft key while watching a screen.

The operation key part 401 is provided with an operation key made of a hardware key. For example, the operation key is a function switching key to switch among a start key, a numeric key, a reset key, a copy, a printer, a scanner and a facsimile.

The control part 500 includes a CPU (Central Processing Unit), a ROM (Read Only Memory), and a RAM (Random Access Memory). The CPU executes control necessary for activating the image forming apparatus 1a for the above-mentioned components (for example, the printing part 100) of the image forming apparatus 1a. The ROM stores software necessary for control of an operation of the image forming apparatus 1a. The RAM is used for temporally storing data generated during the execution of the software and for storing application software.

The control part 500 includes, as functional blocks, a timer part 501, a timer control part 502, a first determination part 503, a second determination part 505, and a permission part 506. These blocks will be detailed later.

The communication part 600 includes a facsimile communication part 601 and a network I/F part 603. The facsimile communication part 601 includes an NCU (Network Control Unit) to control connection of a telephone line 605 with a destination facsimile, and a modulation/demodulation circuit to modulate and demodulate a signal for facsimile communication. The facsimile communication part 601 is connected to the telephone line 605.

The network I/F part 603 is connected to a LAN (Local Area Network) 607. The network I/F part 603 is a communication interface circuit for executing communication between personal computers (terminal devices) 20 connected to the LAN 607. FIG. 1 shows plural personal computers 20A, 20B, 20C, 20D, 20E, and 20F connected to the LAN 607. Unless the personal computers 20A, 20B, 20C, 20D, 20E, and 20F need not to be distinguished from one another, they are expressed collectively as the personal computer 20.

The network I/F part 603 receives print data transmitted from the personal computer 20 via the LAN 607. Thus, the network I/F part 603 acts as a receiving part to receive data indicating an image transmitted via the network I/F part 603. The printing part 100 executes a printing job of the print data received by the network I/F part 603. While a description will be made by taking the print data as an example, as the data indicating the image, not necessarily limited thereto, any data called as image data may be available.

The timer part 501 measures a time. The printing job precedingly executed is called as a first printing job, and a printing job executed subsequent to the first printing job is called as a second printing job. The timer control part 502 causes the timer part 501 to start measuring the time when the printing part 100 completes the first printing job.

The first determination part 503 determines whether or not there exists the second printing job. The first determination part 503 determines whether or not there exists the second printing job until the time when a predetermined period to be described later has passed from the time when the print data to be printed by the first printing job is received by the network I/F part 603.

When it is determined by the first determination part 503 that there exists the second print, the second determination part 504 determines whether or not the time measured by the timer part 501 has passed the predetermined period.

The job control part 505 controls a printing job to be executed by the printing part 100. Examples of the printing job control include interval control. That is, when it is determined by the second determination part 504 that the predetermined period has not yet passed, the job control part performs the interval control to cause the printing part 100 to execute the second printing job after the predetermined period has passed.

The interval is forcibly provided from completion of the first printing job to a start of the second printing job. This distinguishes a printed matter discharged into the paper discharging part 10 by the execution of the first printing job from a printed matter discharged into the paper discharging part 10 by the execution of the second printing job. A length of the interval, that is, the period from the completion of the first printing job to the start of the second printing job is previously determined. The predetermined period is 10 seconds, for example. The predetermined period is stored in advance in the job control part 505.

For example, lets us suppose here a situation where the image forming apparatus 1a executes a printing job of the print data transmitted from the personal computer 20A. On this occasion, the print data is transmitted from the personal computer 20B to the image forming apparatus 1a. The image forming apparatus 1a executes a printing job (first printing job) of the print data transmitted from the personal computer 20A. The image forming apparatus 1a starts a second printing job after a predetermined period has passed. In other words, the image forming apparatus 1a does not start immediately a printing job (second printing job) of the print data transmitted from the personal computer 20B after the first printing job is completed.

The permission part 506 permits the job control part 505 to perform interval control when the human detection sensor 11 detects a human. Otherwise, the permission part 506 does not permit the job control part 505 to perform interval control when the human detection sensor 11 does not detect a human. It is to be noted that it may carry out an embodiment not including the permission part 506 and the human detection sensor 11.

Figure 2:
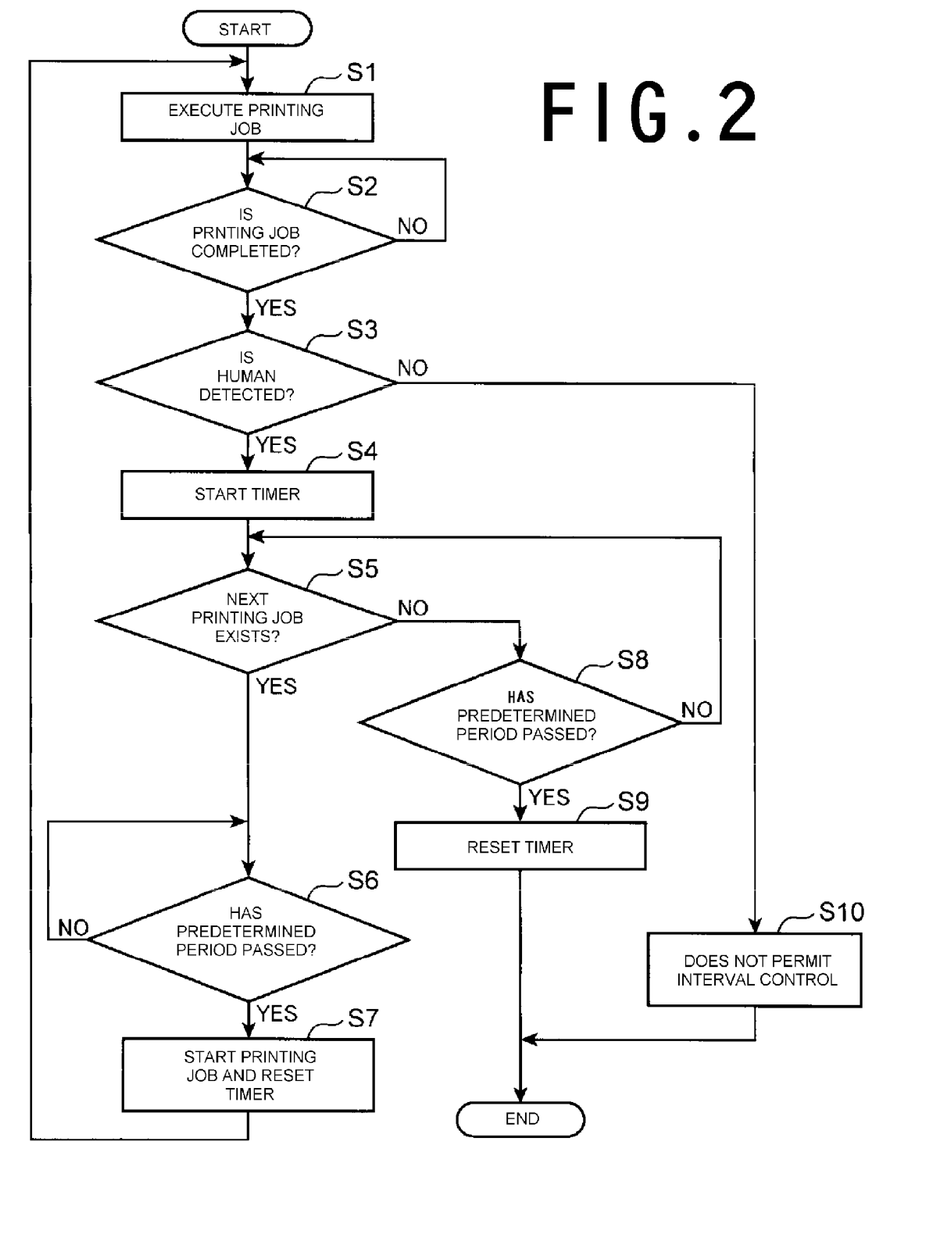
FIG. 2 is a flowchart explaining an operation of the image forming apparatus according to the first embodiment.

The image forming apparatus 1a is connected to the plural personal computers 20 via the LAN 607. For this reason, the image forming apparatus 1a can be used as a network printer. An operation of the image forming apparatus 1a as a network printer will be described with reference to FIG. 1 and FIG. 2. FIG. 2 is a flowchart explaining an operation of the image forming apparatus 1a. A description will be made by taking the print data as an example, as data indicating an image.

An explanation starts with a state where the printing part 100 executes a printing job of the print data received by the network I/F part 603 (step S1). The job control part 505 determines whether or not the printing job in step S1 (i.e., first printing job) is completed (step S2).

If it is determined by the job control part 505 that the printing job is not yet completed (No in step S2), the process of step 2 will be repeated.

Otherwise, if it is determined by the job control part 505 that the printing job is completed (Yes in step S2), the permission part 506 determines whether or not the human detection sensor 11 outputs a detection signal indicating the detection of a human (step S3).

If it is determined by the permission part 506 that the human detection sensor 11 outputs a detection signal (Yes in step S3), the permission part 506 permits interval control to be described later.

The timer control part 502 causes the timer part 501 to start measuring a time (step S4).

The first determination part 503 determines whether or not there exists a next printing job (i.e. second printing job) to be executed by the printing part 100 (step S5). Specifically, the first determination part 503 determines whether or not the network I/F part 603 receives second print data before the printing part 100 executes the first printing job. In this connection, if the network I/F part 603 does not receive the second print data before the printing part 100 executes the first printing job, the first determination part 503 determines whether or the network I/F part 603 receives the second print data during the execution of the first printing job by the printing part 100 (step S1). If the network I/F part 603 does not receive the second print data during the execution of the first printing job by the printing job 100, the first determination part 503 determines whether or not the network I/F part 603 receives the second print data after the printing part 100 completes the first printing job (no in step S2).

If it is determined by the first determination part 503 that there exists a next printing job to be executed by the printing part 100 (Yes in step S5), the second determination part 504 determines in step S4 whether or not the time measured by the timer part 501 has passed the predetermined period (step S6).

If it is determined by the second determination part 504 that the time measured by the timer part 501 has not yet passed the predetermined period (No in step S6), the process of step S6 will be repeated.

Otherwise, if it is determined by the second determination part 504 that the time measured by the timer part 501 has passed the predetermined period (Yes in step S6), the job control part 505 causes the printing part 100 to start executing the next printing job (step S7). The timer control part 502 causes the timer part 501 to stop measuring the time, and to reset the timer part 501 (step S7). Then, the control returns to step S1.

If it is determined by the first determination part 503 that there exists no next printing job to be executed by the printing part 100 (No in step S5), the second determination part 504 determines in step S4 whether or not the time measured by the timer part 501 has passed the predetermined period (step S8). The predetermined period in step S8 is the same as that in step 6.

If it is determined by the second determination part 504 that the time measured by the timer part 501 has not yet passed the predetermined period (No in step S8), the control returns to step S5.

Otherwise, if it is determined by the second determination part 504 that the time measured by the timer part 501 has passed the predetermined period (Yes in step S8), the timer control part 502 causes the timer part 501 to stop measuring the time, and to reset the timer part 501 (step S9).

If it is determined by the permission part 506 that the human detection sensor 11 does not output a detection signal (No in step S3), the permission part 506 does not permit interval control (step 10). Thus, the job control part 505 executes a next printing job, as long as the next printing job exists, regardless of whether or not the predetermined period has passed.

Main effects or advantages exerted by the first embodiment will be described. The image forming apparatus 1*a* according to the first embodiment does not execute a second printing job until the predetermined period has passed after the completion of the discharge of a printed matter into the paper discharging part 10 by the execution of a first printing job (Yes in step S2, Yes in step S3, step S4, Yes in step S5, Yes in step S6, and step 7). For this reason, a user can distinguish a printed matter created by the execution of the first printing job from a printed matter created by the execution of the second printing job while the user is waiting for the discharge of the printed matter into the paper discharging part 10 created by the execution of the first printing job. Thus, this prevents the user from inadvertently taking away the printed matter created by the execution of the second printing job.

Further, according to the first embodiment, the embodiment allows the above-mentioned effects or advantage to be exerted without being equipped with specially prepared devices or the like in the paper discharging part 10, such as a sensor for detecting a printed matter.

When a user is waiting for the discharge of the printed matter created by the execution of the first printing job into the paper discharging part 10, the image forming apparatus performs interval control to enable the user to distinguish a printed matter created by the execution of the first printing job from a printed matter created by the execution of the second printing job. If it were not for a human in the vicinity of the image forming apparatus 1*a*, it would end in vain even by performing the interval control. According to the first embodiment, the interval control will be performed subject to the presence of a human in the vicinity of the image forming apparatus 1*a* (Yes in step S3).

Figure 3:
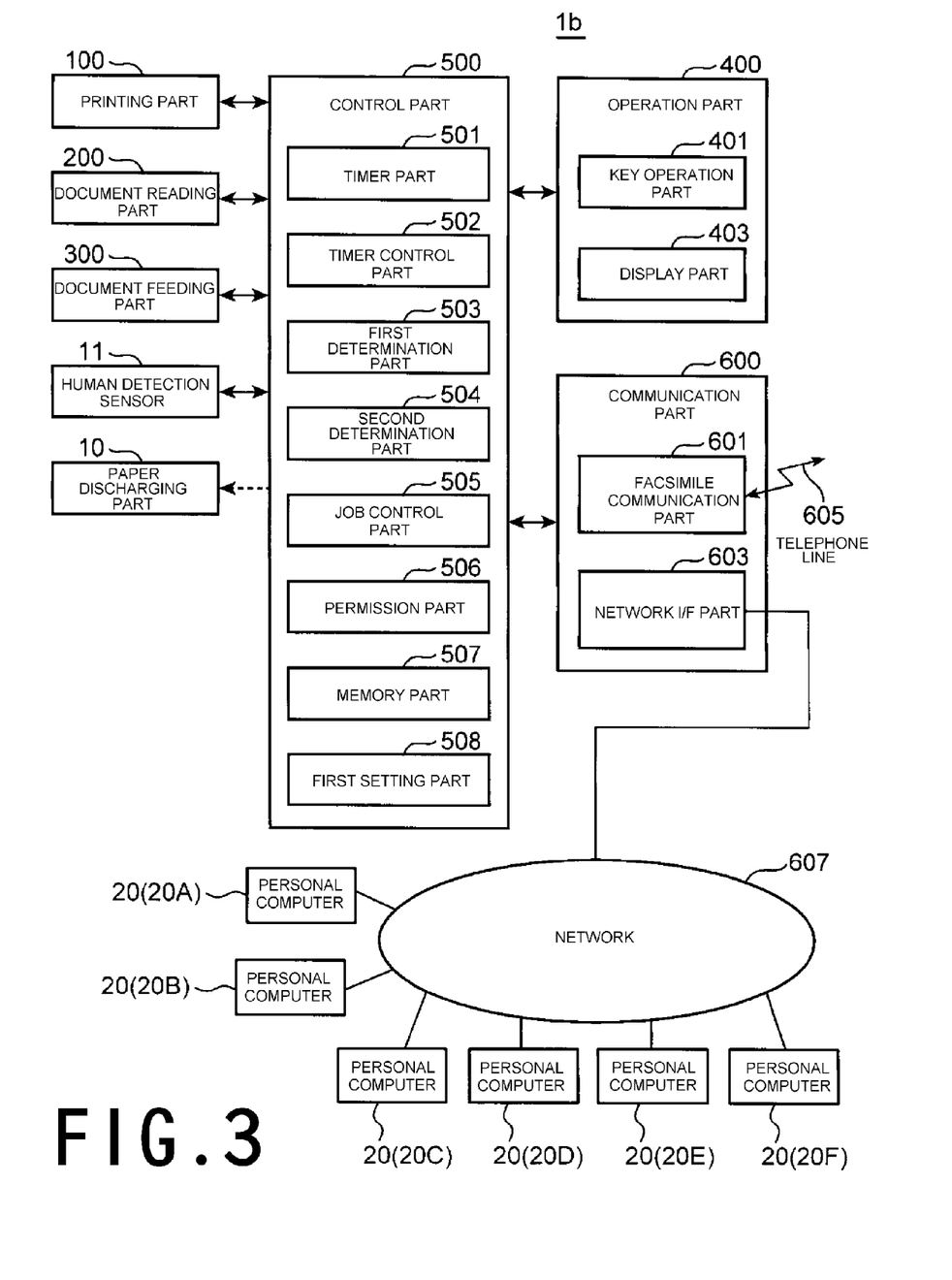
FIG. 3 is a block diagram indicating a configuration of an image forming apparatus according to a second embodiment of the present disclosure.

A second embodiment will be described. The second embodiment automatically changes a length of the predetermined period depending on the type of the printing jobs. FIG. 3 is a block diagram indicating a configuration of an image forming apparatus 1*b* according to the second embodiment. In the image forming apparatus 1*b*, parts or components similar to those of the image forming apparatus 1*a* according to the first embodiment shown in FIG. 1 are designated by the same reference character, and therefore a description thereof will be omitted for brevity's sake.

The control part 500 of the image forming apparatus 1*b* further includes, as function blocks, a memory part 507 and a first setting part 508.

The image forming apparatus 1*b* has a single-sided monochrome printing function and a double-sided monochrome printing function. A period necessary for printing an image on a sheet of paper by the double-sided printing is longer than that of the single-sided monochrome printing. Thus, the image forming apparatus 1*b* has plural printing mode functions, each being different in a period necessary for printing an image on a sheet of paper.

The memory part 507 previously stores information indicating the period necessary for printing an image on a sheet of paper for every print mode (in other words, depending on the type of the printing jobs). Here, information indicating 3 seconds for the single-sided monochrome printing and 6 seconds for the double-sided monochrome printing are previously stored therein, respectively.

The first setting part 508 determines a period necessary for printing an image on a sheet of paper in the first printing job with reference to the above-mentioned information, multiplies the determined period by a numerical value N, and sets the predetermined period. Here, the numerical value N is 2, for example.

Figure 4:
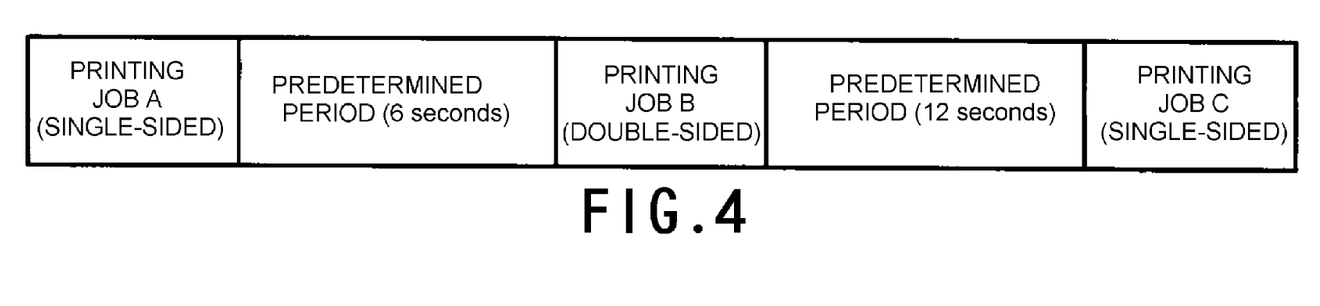
FIG. 4 is an explanatory drawing explaining a relationship between sequentially executed printing jobs A, B and C, and a predetermined period.

The function of the first setting part 508 will be described by a specific example. FIG. 4 is an explanatory drawing explaining a relationship between sequentially executed printing jobs A, B and C, and the predetermined period. Here, as the time necessary for printing an image on a sheet of paper, the single-sided monochrome printing is assumed to be 3 seconds, and the double-sided monochrome printing is assumed to be 6 seconds. In a case where the first printing job is the single-sided monochrome printing, the predetermined period is 6 seconds (3 seconds×2), while in a case where the first printing job is the double-sided monochrome printing, the predetermined period is 12 seconds (6 seconds×2).

The printing jobs A and C are a job for single-sided monochrome printing on 10 sheets of paper. The printing job B is job for double sided monochrome printing on 10 sheets of paper. The printing jobs A, B, and C will be assumed to be executed in such an order.

In a relationship between the printing jobs A and B, the printing job A is the first printing job, while the printing job B is the second printing job. Since the printing job A is for single-sided monochrome printing, the first setting part 508 sets the predetermined period (6 seconds, in this case) longer than the period (3 seconds) necessary for printing an image on a sheet of paper in the single-sided monochrome printing.

In a relationship between the printing jobs B and C, the printing job B is the first printing job, while the printing job C is the second printing job. Since the printing job B is for double-sided monochrome printing, the first setting part 508 sets the predetermined period (12 seconds, in this case) longer than the period (6 seconds) necessary for printing an image on a sheet of paper in the double-sided monochrome printing.

An operation of the image forming apparatus 1b according to the second embodiment includes an operation of the image forming apparatus 1a shown in FIG. 2. Further, a process in which the first setting part 508 sets the predetermined period is added in step S4.

The image forming apparatus 1b according to the second embodiment exhibits the following effects or advantages, in addition to those exerted by the image forming apparatus 1a according to the first embodiment.

In the second embodiment, the predetermined period is set longer than the period necessary for printing an image on a sheet of paper in the first printing job. This allows a user to easily distinguish a printed matter created by the execution of the first printing job from a printed matter created by the execution of the second printing job, when the user is waiting for the discharge of the printed matter into the paper discharging part 10 created by the execution of the first printing job. The period necessary for printing an image on a sheet of paper varies depending on the type of the printing jobs (for example, single-sided printing mode or double-sided printing mode). According to the second embodiment, the embodiment allows the predetermined period to be automatically set depending on the type of the printing jobs.

Figure 5:
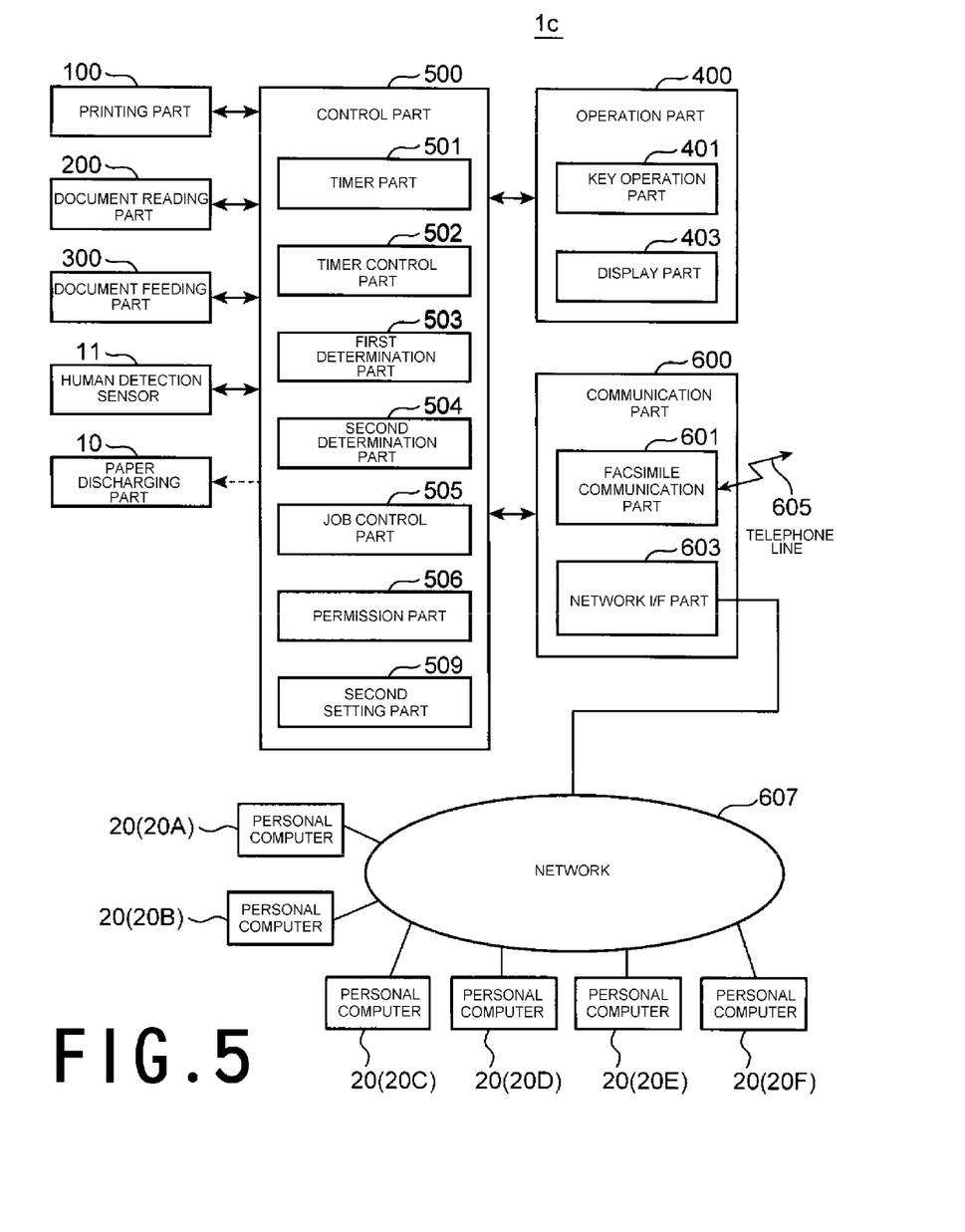
FIG. 5 is a block diagram indicating a configuration of an image forming apparatus according to a third embodiment of the present disclosure.

A third embodiment will be described. The third embodiment allows a user or a supervisor to set the predetermined period. FIG. 5 is a block diagram indicating a configuration of an image forming apparatus 1c according to the third embodiment. In the image forming apparatus 1c, parts or components similar to those of the image forming apparatus 1a according to the first embodiment shown in FIG. 1 are designated by the same reference character, and therefore a description thereof will be omitted for brevity's sake.

The control part 500 of the image forming apparatus 1c according to the third embodiment further includes a second setting part 509, as a function block.

The user or the supervisor of the image forming apparatus 1c is allowed to input the period by operating the operation part 400. The second setting part 509 sets the period input by the operation part 400 as the predetermined period.

The image forming apparatus 509 according to the third embodiment operates in the same way as the image forming apparatus 1a according to the first embodiment shown in FIG. 1 under the conditions where the predetermined period is set by the second setting part 509.

The image forming apparatus 1c according to the third embodiment exhibits effects or advantages, in addition to those exerted by the image forming apparatus 1a according to the first embodiment. According to the third embodiment, the embodiment allows the user or the supervisor of the image forming apparatus 1c to set the predetermined period.

The third embodiment includes a first modification and a second modification. First of all, the first modification will be described. In the first modification, the predetermined period can be set depending on a case where the personal computer 20 from which the print data to be printed by the first printing job is transmitted and the personal computer 20 from which the print data to be printed by the second printing job is transmitted are the same, and on a case where the personal computers 20 are different. Hereinbelow, the former case will be referred to as "the case of the same personal computer 20", while the latter case will be referred to as "the case of the different personal computer 20".

The operation part 400 can input the predetermined period depending on each of the case of the same personal computer 20 and the case of the different personal computer 20.

The second setting part 509 sets the predetermined period depending on each of the case of the same personal computer 20 or the case of the different personal computer 20.

Figure 6:
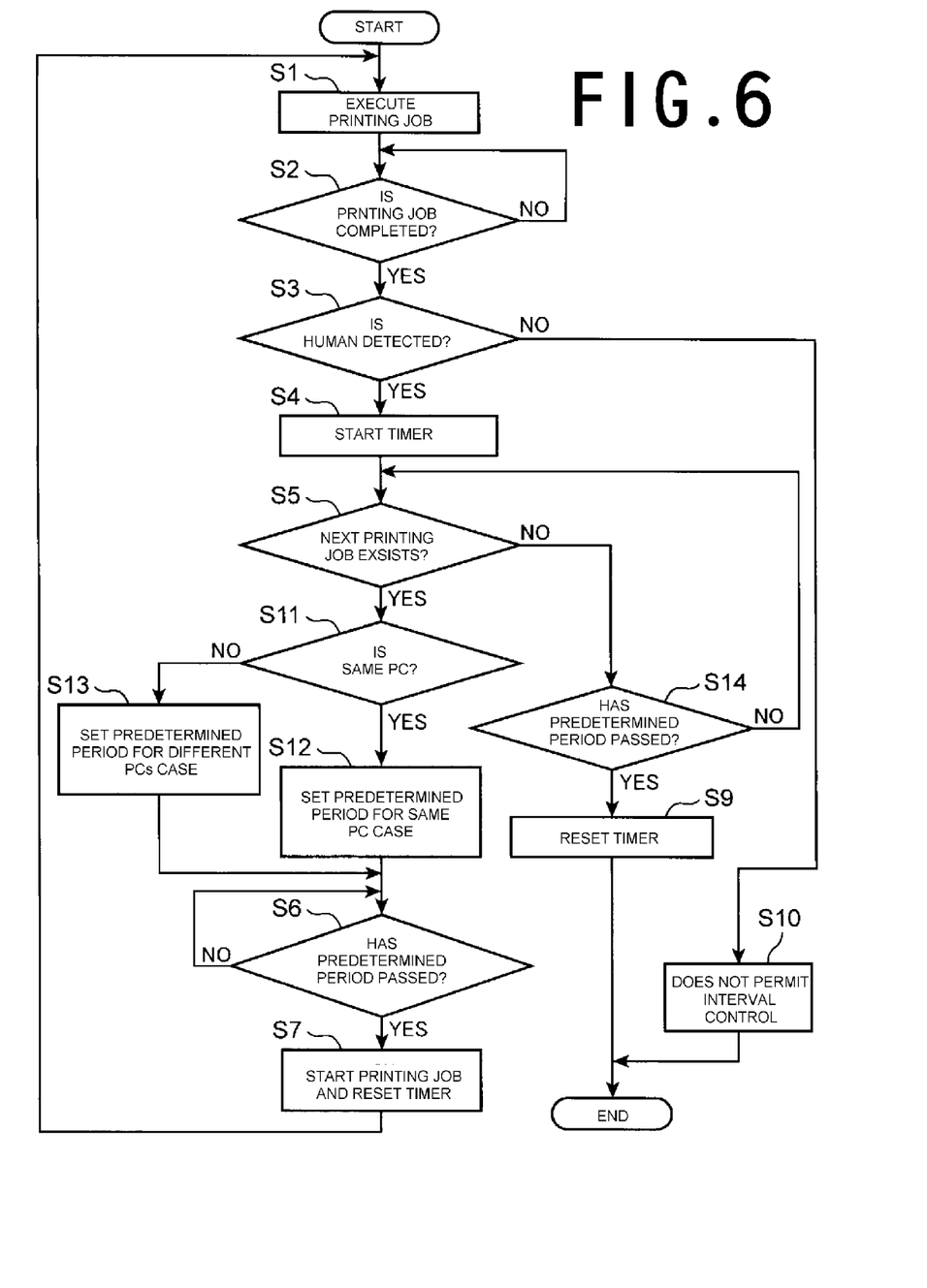
FIG. 6 is a flowchart explaining an operation of a first modification of the image forming apparatus according to the third embodiment.

An operation of the first modification of the image forming apparatus 1c will be described. FIG. 6 is a flowchart explaining an operation of the first modification of the image forming apparatus 1c. In FIG. 6, processes similar to those in the flowchart of the image forming apparatus 1a according to the first embodiment shown in FIG. 2 are designated by the same reference character, and therefore a description thereof will be omitted for brevity's sake. What is different between the flowchart shown in FIG. 6 and the flowchart shown in FIG. 2 is in that steps S11, S12 and S13 are added, and step S14 is provided instead of step S8.

If it is determined by the first determination part 503 that there exists the next printing job (i.e. second printing job) to be executed by the printing part 100 (Yes in step S5), the second setting part 509 determines whether or not it is the same personal computer 20 (step S11). In other words, the second setting part 509 determines whether or not the personal computer 20 from which the print data to be printed by the second printing job is transmitted and the personal computer 20 from which the print data to be printed by the first print data is transmitted are the same. If transmission source information added to the first printing job is identical with transmission source information added to the second printing job, it is determined to be the same personal computer 20.

If it is determined by the second setting part 509 to be the same personal composer 20 (Yes in step S11), the second setting part 509 sets the predetermined period for the same personal computer 20 (step S12). Then, the control proceeds to step S6.

Otherwise, if it is determined by the second setting part 509 to be the different personal computer 20 (No in step S11), the second setting part 509 sets the predetermined period for the case of the different personal computer 20 (step S13). Then, the control proceeds to step S6.

If it is determined by the first determination part 503 that there exists no next printing job to be executed by the printing part 100 (i.e. second printing job) (No in step S5), the second determination part 506 determines, in step S14, whether or not the time measured by the timer part 501 has passed the predetermined period (step S14). The predetermined period is longer than the predetermined period for the case of the same personal computer 20 and the predetermined period for the case of the different personal computer 20. Thereby, this prevents the time part 501 from being reset before the predetermined period for the case of the same personal computer 20 has passed, or the predetermined period for the case of the different personal computer 20 has passed.

The effects or advantages of the first modifications are as follows. As far as the same personal computer 20 (i.e. as far as the personal computer 20 from which the print data to be printed by the second printing job is transmitted and the personal computer 20 from which the print data to be printed by the first print job is transmitted are the same), a user who is an owner of the printed matter created by the enexecution of the first printing job, and a user who is an owner of the printed matter created by the execution of the second printing job are the same. For this reason, there will not occur a situation where the printed matter created by the execution of the second printing job may be inadvertently taken away by the user who is the owner of the printed matter created by the execution of the first printing job. According to the first modification, the modification allows the predetermined period to be set depending on each of the case of the same personal computer 20 and on the case of the different personal computer 20. Accordingly, for the case of the same personal computer 20, it is possible for the predetermined period to be set longer than that for the case of the different personal computer 20, or set to zero. Thus, for the case of the same personal computer 20, it is possible to advance the time necessary for discharging a printed matter created by the execution of the second printing job into the paper discharging part 10.

Next, the second modification will be described. In the second modification, it is possible to set the predetermined period depending on the type of the printing jobs.

The operation part 400 can input the predetermined period depending on the type of the printing jobs. The second setting part 509 sets the predetermined period depending on the type of the printing jobs.

As the time necessary for printing image on a sheet of paper, the single-sided monochrome printing is assumed to be 3 seconds, while the double-sided monochrome printing is assumed to be 6 seconds. In a case where the first printing job is the single-sided monochrome printing, the predetermined period is set to 6 seconds while in a case where the first printing job is the dual-sided monochrome printing, the predetermined period is set to 12 seconds, for example.

Figure 7:
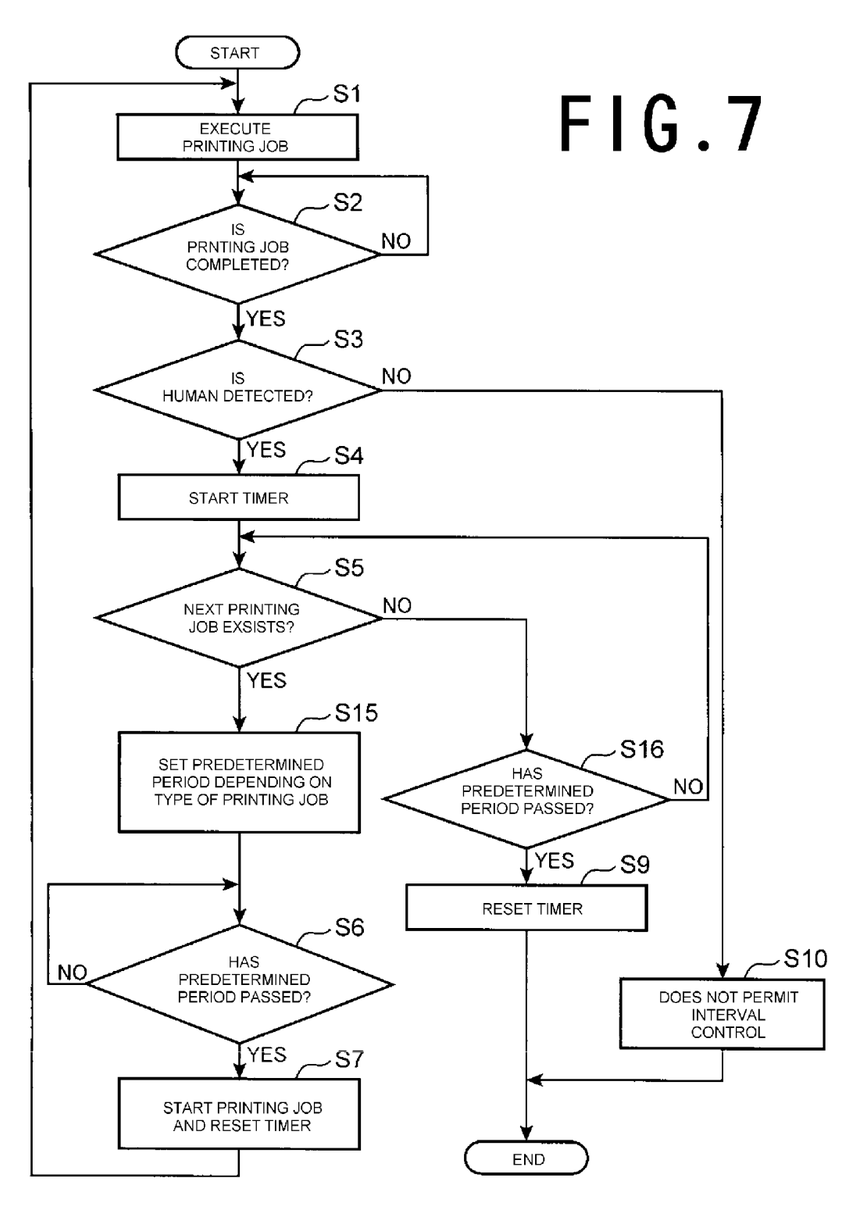
FIG. 7 is a flowchart explaining an operation of a second modification of the image forming apparatus according to the third embodiment.

An operation of the second modification of the image forming apparatus 1c will be described. FIG. 7 is a flowchart explaining an operation of the second modification of the image forming apparatus 1c. In FIG. 7, processes similar to those in the flowchart shown in FIG. 2 of the image forming apparatus 1a according to the first embodiment are designated by the same reference character, and therefore a description thereof will be omitted for brevity's sake. What is different between the flowchart shown in FIG. 7 and the flowchart shown in FIG. 2 is in that step S15 is added and step S16 is provided instead of step S8.

If it is determined by the first determination part 503 that there exists a next printing job (i.e. second printing job) to be executed by the printing part 100 (Yes in step S5), the second determination part 509 sets the predetermined period (step S5) depending on the type of the first printing job. Then, the control proceeds to step 15).

Otherwise, if it is determined by the first determination part 503 that there exists no next printing job (i.e. second printing job) to be executed by the printing part 100 (No in step S5), the second determination part determines whether or not the time measured by the timer part 501 has passed the predetermined period (step S16). The predetermined period is longer than the longest period out of the periods previously set depending on the type of the printing jobs. For example, the predetermined period for the single-sided monochrome printing job is set to 6 seconds, while the predetermined period for the double-sided monochrome printing is set to 12 seconds. In the event the predetermined period is set to be not greater than 12 seconds and the first printing job is the double-sided printing job, the timer will result in being reset (step 9) before the predetermined period for the double-sided printing job has passed. Then, setting the predetermined period to the aforementioned length prevents the occurrence where the timer is reset before the predetermined period for the double-sided printing job has passed.

The effects or advantages of the second modification are as follows. The time necessary for printing an image on a sheet of paper varies depending on the type of the printing jobs (for example, single-sided printing mode or double-sided printing mode). According to the second modification, it is possible for a user or a supervisor of the image forming apparatus 1c to set the predetermined period depending on the type of the printing jobs.

The user or the supervisor of the image forming apparatus 1c can set the predetermined period described in the third embodiment and its first and second modifications. Setting the predetermined period by the supervisor of the image forming apparatus 1c allows the predetermined period to uniformly apply to all the personal computers 20 (all users) connected to the image forming apparatus 1c via the network 607. Further, setting the predetermined period by each user of the image forming apparatus 1c allows the different period to be applied to every individual personal computer 20 (every individual user) connected to the image forming apparatus 1c via the network 607.

In summary, a printed matter created by the information forming apparatus of the typical case is discharged into the paper discharging part called as a bin or a discharge tray and is held in the paper discharging part. In a case where the paper discharging part is shared with any other user, there is a possibility that the printed matter may be inadvertently taken away by the other user.

On the contrary, the present disclosure provides an image forming apparatus capable of preventing a printed matter from being inadvertently taken away by any other user.

More specifically, the image forming apparatus according to the present disclosure does not execute the second printing job until the predetermined period has passed after the completion of the discharge of the printed matter into the paper discharging part is completed by the execution of of the first printing job. For this reason, when a user is waiting for the discharge of the printed matter created by the execution of the first printing job, the user can distinguish the printed matter created by the execution of the first printing job from the printed matter created by the execution of the second printing job. Thus, the present disclosure enables the printed matter created by the execution of the second printing job to be prevented from being inadvertently taken away by the user of the printed matter created by the execution of the first printing execution.

The predetermined period is set in the first printing job longer than the period necessary for printing an image on a sheet of paper. By doing this, a user can easily distinguish the printed matter created by the execution of the first printing job from the printed matter created by the execution of the second printing job when the user is waiting for the discharge of the printed matter created by the execution of the first printing job into the paper discharging part. The period necessary for printing an image on a sheet of paper varies depending on the type of the printing jobs (for example, single-sided printing or double-sided printing). This configuration allows the predetermined period to be automatically set depending on the type of the printing jobs.

The foregoing configuration further includes an operation part that inputs the period, and a second setting part that sets the period by the operation part as the predetermined period.

This configuration allows a user or a supervisor of the image forming apparatus to set the predetermined period.

In the aforesaid configuration, the operation part can input the period depending on a case where the terminal device from, which the data to be printed by the first printing job is transmitted and a case where the terminal device from which the data to be printed by the second printing is transmitted are the same, and on a case where the terminal devices are different. The second setting part sets the predetermined period depending on each of the same terminal device and the different terminal device.

If the terminal device from which the data to be printed by the first printing job is transmitted and the terminal device from which the data to be printed by the second printing job is transmitted are the same, the user who is an owner of the printed matter created by the execution of the first printing job and the user who's is an owner of the printed matter created by the execution of the second printing job are the same. For this reason, there will not occur a situation where the printed matter created by the execution of the second printing job is inadvertently taken away by the user who is the owner of the printed matter created by the execution of the first printing job. This configuration allows the predetermined period to be set depending on the case where the terminal device from which the data to be printed by the first printing job is transmitted and the terminal device from which the data to be printed by the second printing job is transmitted are the same, and on the case where the terminal devices are different. For this reason, in a case where the terminal device from which the data to be printed by the first printing job is transmitted and the terminal device from which the data to be printed by the second printing job is transmitted are the same, the predetermined period can be set shorter than that of the case where the terminal devices are different, or set to zero. Thus, in the case where the terminal devices are the same, it is possible to advance the time at which the printed matter created by the execution of the second printing is discharged into the paper discharging part.

Also, the period necessary for printing an image on a sheet of paper varies depending on the type of the printing jobs (for example, single-sided printing mode or double-sided printing mode). According to the this configuration, this configuration allows a user or a supervisor of the image forming apparatus $1c$ to set the predetermined period depending on the type of the printing jobs.

When the user is waiting for the discharge of the printed matter created by the execution of the first printing job into the paper discharging part, the image forming apparatus performs interval control to enable the user to distinguish the printed matter created by the execution of the first printing job from the printed matter created by the execution of the second printing job. If it were not for a human in the vicinity of the image forming apparatus, it would end in vain even by performing the interval control. According to this configuration, the interval control will be performed subject to the presence of a human in the vicinity of the image forming apparatus.

As a result, the present disclosure prevents the printed matter from being inadvertently taken away by any other user.

What is claimed is:

1. An image forming apparatus comprising:
   a receiving part that receives data indicating an image transmitted via a network;
   a printing part that executes a printing job creating a printed matter on which the image is printed indicated by the data received by the receiving part;
   a paper discharging part into which the printed matter created by the printing part is discharged and in which the printed matter is held;
   a timer part;
   a timer control part that causes the timer part to start measuring a time when a first printing job that is a printing job precedingly executed is completed, wherein said completion of the first printing job is completion of discharging of all printed matter of the first printing job;
   a first determination part that determines whether or not there exists a second printing job that is a printing job received subsequent to reception of the first printing job and to be printed subsequent to the first printing job;
   a second determination part that determines whether or not a time measured by the timer part has passed a predetermined period when it is determined by the first determination part that there exists the second printing job;
   a job control part that performs interval control causing the printing part to execute the second printing job successively following the first printing job after the predetermined period has passed when it is determined by the second determination part that the predetermined period has not yet passed, wherein:
      the printing part executes the second printing job at a later time when the printing part prints under the interval control than when the printing part prints not under the interval control; and
      the first printing job and the second printing job are discharged into the same bin or tray of the discharge part;
   a human detection sensor that detects a human who is in the vicinity of the image forming apparatus; and
   a permission part that permits the job control part to perform the interval control when the human detection sensor detects the human, and does not permit the job control part to perform the interval control when the human detection sensor does not detect the human.

2. The image forming apparatus according to claim 1, further comprising
an operation part that inputs a period; and
a second setting part that sets the period input by the operation part as the predetermined period.

3. The image forming apparatus according to claim 2, wherein
the operation part can input the period depending on a case where a terminal device from which the data to be printed by the first printing job is transmitted and a terminal device from which the data to be printed by the second printing job is transmitted are the same, and on a case where the terminal devices are different; and
the second setting part sets the predetermined period when the terminal devices are the same and sets the predetermined period when the terminal devices are different, wherein the second setting part sets the predetermined period differentially depending on whether the terminal devices are the same or different.

4. The image forming apparatus according to claim 2, wherein
the operation part can input the period depending on the type of the printing jobs, and
the second setting part sets the predetermined period depending on the type of the printing jobs.

5. The image forming apparatus according to claim 1, further comprising
a memory part that previously stores a period necessary for printing an image on a single sheet of paper, and
a setting part that sets the predetermined period as longer than the period necessary for printing an image on a single sheet of paper.

6. The image forming apparatus according to claim 5, wherein
the memory part stores information corresponding the period necessary for printing the image on a single sheet of paper to each of a plurality of types of printing jobs;
the setting part sets the predetermined period as corresponding to a type of printing job defined by the first printing job.

7. The image forming apparatus according to claim 6, wherein the plurality of types of printing jobs comprises single-sided printing and double-sided printing.

8. The image forming apparatus according to claim 1, further comprising a second setting part that sets the predetermined period when the terminal devices are the same and sets the predetermined period when the terminal devices are different, wherein the second setting part sets the predetermined period differentially depending on whether the first printing job and the second printing job are received from the same or different terminals.

9. The image forming apparatus according claim 8, wherein the predetermined period is longer when the first printing job and the second printing job are received from the different terminals relative to when the first printing job and the second printing job are received from different terminals.

10. The image forming apparatus according to claim 1, wherein the time interval between completion of discharge of the final sheet of the first printing job and the start of discharge of the first sheet of the second printing is longer than the time interval between the completion of discharge and the start of discharge of successive sheets of the first printing job.

11. An image forming method carried out on an image forming apparatus, the method comprising the steps of:
receiving a first printing job via a network;
executing the first printing job by creating a first printed matter on which an image included in the first printing job is printed;
holding the created and discharged first printed matter;
causing a timer part to start measuring a time upon completion of discharge of all the first printed matter;
determining whether or not there exists a second printing job received subsequent to the reception of the first printing job and to be executed subsequent to the first printing job;
determining whether or not the time measured by the timer part has passed a predetermined period when it is determined that there exists the second printing job;
causing a human sensor to detect whether a human is in the vicinity of the image forming apparatus; and
when it is determined that the predetermined period has not yet passed and the human is detected by the human sensor, performing interval control by waiting and then executing the second printing job successively following the first printing job by creating a second printed matter on which an image included in the second job is printed after the predetermined period has passed, wherein:
the second printing job is executed at a later time when the second printing job is executed under the interval control than when the second printing job is not executed under the interval control; and
the first printing job and the second printing job are discharged into a same bin or tray.

12. The image forming image forming method according to claim 11, further comprising:
storing on a memory part, a period necessary for printing an image on a single sheet of paper, and
setting the predetermined period as longer than the period necessary for printing an image on a single sheet of paper.

13. The image forming image forming method according to claim 12, wherein:
the step of storing comprises storing information corresponding the period necessary for printing the image on a single sheet of paper to each of a plurality of types of printing jobs;
the step of setting the predetermined period is performed after determining a type of printing job defined by the first printing job; and
the step of setting comprises the setting predetermined period as corresponding to the type of printing job defined by the first printing job.

14. The image forming image forming method according to claim 13, wherein the plurality of types of printing jobs comprises single-sided printing and double-sided printing.

15. The image forming image forming method according to claim 11, wherein the predetermined period is set when the terminal devices are the same and wherein the predetermined period is set when the terminal devices are different, and wherein the predetermined period is differentially set depending on whether the first printing job and the second printing job are received from the same or different terminals.

16. The image forming image forming method according to claim 15, wherein the predetermined period is set longer when the first printing job and the second printing job are received from the different terminals relative to when the first printing job and the second printing job are received from different terminals.

17. The image forming method according to claim 11, wherein
the image forming apparatus receives a period input by an operation part; and
sets the period input by the operation part as the predetermined period.

18. An image forming method carried out on an image forming apparatus, the comprising the steps of:
receiving first printing job via a network;
executing the first printing job by creating a first printed matter on which an image included in the first printing job is printed;
holding the created and discharged first printed matter;
causing a timer part to start measuring a time upon completion of discharge of all the first printed matter;
determining whether or not there exists a second printing job received subsequent to the reception of the first printing job and to be executed subsequent to the first printing job;
determining whether or not the time measured by the timer part has passed a predetermined period when it is determined that there exists the second printing job,
when it is determined that the predetermined period has not yet passed, performing interval control by waiting and then executing the second printing job successively following the first printing job by creating a second printed matter on which an image included in the second job is printed after the predetermined period has passed, wherein:
the second printing job is executed at a later time when the second printing job is executed under the interval control than when the second printing job is not executed under the interval control;
the time interval between completion of discharge of the final sheet of the first printing job and start of discharge of the first sheet of the second printing is longer than the time interval between completion of discharge and start of discharge of successive sheets of the first printing job; and
the first printing job and the second printing job are discharged into a same bin or tray.

* * * * *